US009689300B2

(12) United States Patent
Kim (10) Patent No.: US 9,689,300 B2
(45) Date of Patent: Jun. 27, 2017

(54) ENGINE CONTROL SYSTEM AND METHOD (71) Applicant: Hyundai Motor Company, Seoul (KR)

(72) Inventor: Jong Gu Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 98 days.

(21) Appl. No.: 14/798,491

(22) Filed: Jul. 14, 2015

(65) Prior Publication Data
US 2016/0169095 A1 Jun. 16, 2016

(30) Foreign Application Priority Data
Dec. 15, 2014 (KR) .................. 10-2014-0180675

(51) Int. Cl.
*F01N 13/10* (2010.01)
*F02B 37/24* (2006.01)
(Continued)

(52) U.S. Cl.
CPC ......... *F01N 13/008* (2013.01); *F01N 13/107* (2013.01); *F02B 37/18* (2013.01); *F02B 37/24* (2013.01); *F02D 41/0007* (2013.01); *F02D 41/0052* (2013.01); *F02D 41/1441* (2013.01); *F02D 41/1446* (2013.01); *F02M 26/47* (2016.02); *F01N 2560/06* (2013.01);
(Continued)

(58) Field of Classification Search
CPC ...... F01N 13/008; F01N 13/10; F01N 13/107; F01N 2560/06; F01N 2560/14; F02B 37/18; F02B 37/24; F02D 41/0007; F02D 41/0052; F02D 41/0077; F02D 41/1441; F02D 41/1446; F02D 41/30; F02D 2021/083
See application file for complete search history.

(56) References Cited

U.S. PATENT DOCUMENTS 5,497,751 A * 3/1996 Ohtake ................... F02B 37/18
123/479
5,983,876 A * 11/1999 Irons .................... F02D 41/1497
123/478
(Continued)

FOREIGN PATENT DOCUMENTS

JP 2007-077858 A 3/2007
KR 10-1997-0044886 A 7/1997

*Primary Examiner* — Audrey K Bradley
(74) *Attorney, Agent, or Firm* — Mintz Levin Cohn Ferris Glovsky and Popeo, P.C.; Peter F. Corless (57) ABSTRACT An engine control system is provided and includes an engine having combustion chambers and provides driving torque through combustion of a fuel injected into the combustion chambers. A turbocharger includes a turbine rotated according to flow energy of exhaust gas, a compressor compressing external air, and a vane adjusting amount of exhaust gas supplied to the turbine. An EGR device recirculates exhaust gas to the combustion chamber. An exhaust manifold includes a body with an internal fluid path, exhaust inlets in which exhaust gas is introduced, a partition to form internal fluid paths, and an exhaust outlet to which exhaust gas is exhausted. Temperature sensors measure temperature of exhaust gas flowing through the internal fluid paths. A controller adjusts an opening amount of the vane of the turbocharger, exhaust gas recirculated using the EGR device, and fuel to be injected to the combustion chambers based on measured temperature.

17 Claims, 5 Drawing Sheets (51) Int. Cl.
  *F02M 26/47*   (2016.01)
  *F01N 13/00*   (2010.01)
  *F02D 41/14*   (2006.01)
  *F02B 37/18*   (2006.01)
  *F02D 41/00*   (2006.01)
  *F02D 21/08*   (2006.01)

(52) U.S. Cl.
  CPC .... *F01N 2560/14* (2013.01); *F02D 2021/083* (2013.01); *Y02T 10/144* (2013.01); *Y02T 10/47* (2013.01)

(56) References Cited

U.S. PATENT DOCUMENTS

| | | | | |
|---|---|---|---|---|
| 6,092,016 | A * | 7/2000 | Sarangapani | ........... F02B 75/22 123/676 |
| 2008/0271452 | A1* | 11/2008 | Reynolds | ............ F02D 41/0007 60/611 |
| 2014/0053811 | A1* | 2/2014 | De Ojeda | ............... F02D 41/00 123/435 |

* cited by examiner

ENGINE CONTROL SYSTEM AND METHOD

CROSS-REFERENCE TO RELATED APPLICATION

This application claims priority to and the benefit of Korean Patent Application No. 10-2014-0180675 filed in the Korean Intellectual Property Office on Dec. 15, 2014, the entire contents of which are incorporated herein by reference.

BACKGROUND (a) Field of the Invention

The present invention relates to an engine control system and a method thereof. More particularly, the present invention relates to an engine control system and method that operate an engine using temperatures of exhaust gas detected by two temperature sensors disposed within an exhaust manifold.

(b) Description of the Related Art

In general, an engine provides driving torque through combustion of a fuel injected into a plurality of combustion chambers. Exhaust gas from the combustion chamber of the engine is exhausted to a turbocharger or an exhaust gas recirculation device through the exhaust manifold. Flow energy of the exhaust gas supplied to the turbocharger rotates a turbine of the turbocharger, and rotates a blower connected to the turbine via a rotating shaft to supply the flow energy of the exhaust gas to a cylinder of the engine by suctioning and pressurizing air from the exterior.

Accordingly, when air having higher pressure than atmospheric pressure is excessively supplied to the engine, a substantial amount of air may be supplied to an engine having the same exhaust amount. Further, when increasing an injection amount of a fuel, output of the engine may be increased. Moreover, the exhaust gas exhausted from the combustion chamber via the exhaust manifold is reintroduced into the combustion chamber of the engine using an exhaust gas recirculation (EGR) device. In general, when a ratio of air in a mixture is substantially high to be combusted, mono-nitrogen oxide (NOx) is increased. Accordingly, the EGR device is a system which remixes some (e.g., about 5 to 20%) of the exhaust gas exhausted from the engine in the mixture to reduce an amount of oxygen within the mixer and to suppress generation of the NOx by preventing combustion.

In particular, an amount of air excessively supplied to a combustion chamber via the turbocharger and an amount of exhaust gas recirculated through the EGR device may be operated based on a temperature of the exhaust manifold. However, the exhaust gas of the combustion chamber exhausted through the exhaust manifold may cause difficultly in the operation of the turbocharger and the EGR device due to a difference in an amount of fuel injected into each combustion chamber, a difference of intake air to be introduced into each combustion chamber, a temperature difference within the exhaust manifold, and the like.

The above information disclosed in this section is merely for enhancement of understanding of the background of the invention and therefore it may contain information that does not form the prior art that is already known in this country to a person of ordinary skill in the art.

SUMMARY

The present invention provides an engine control system and a method thereof having advantages of more accurately adjusting an amount of air excessively supplied and an amount of exhaust gas recirculated into a combustion chamber of an engine by more accurately measuring a temperature of an exhaust manifold.

An exemplary embodiment of the present invention provides an engine control system that may include: an engine having a plurality of combustion chambers, and configured to provide driving torque through combustion of a fuel to be injected into the combustion chambers; a turbocharger having a turbine rotated based on flow energy of exhaust gas exhausted from the engine, a compressor configured to compress external air in synchronization with the rotation of the turbine to supply the compressed air to a cylinder, and a vane configured to adjust an amount of exhaust gas to be supplied to the turbine; an exhaust gas recirculation (EGR) device configured to recirculate some (e.g., a portion of, a particular amount of, etc.) of exhaust gas exhausted from the combustion chamber to supply the recirculated gas to the combustion chamber.

In addition, the system may include an exhaust manifold having a body formed therein with an internal fluid path, a plurality of exhaust inlets formed in the body and in which exhaust gas exhausted from the plurality of combustion chambers may be introduced, a partition to divide the internal fluid path into a first internal fluid path and a second internal fluid path, and an exhaust outlet to which exhaust gas introduced from the plurality of exhaust inlets may be exhausted; a first temperature sensor configured to measure a temperature of exhaust gas flowing through the first internal fluid path; a second temperature sensor configured to measure a temperature of exhaust gas flowing through the second internal fluid path; and a controller configured to adjust an opening amount of the vane of the turbocharger, an amount of exhaust gas recirculated through the EGR device, and an amount of a fuel to be injected to the plurality of combustion chambers according to the temperature of the exhaust gas measured by the first temperature sensor and the temperature of the exhaust gas measured by the second temperature sensor.

When a difference between the temperature of the exhaust gas measured by the first temperature sensor and the temperature of the exhaust gas measured by the second temperature sensor is equal to or greater than a preset temperature, and the temperature of the exhaust gas measured by the second temperature sensor is equal to or greater than the temperature of the exhaust gas measured by the first temperature sensor, the controller may be configured to reduce an amount of a fuel to be supplied to a combustion chamber that communicates with (e.g., is connected to) the second internal fluid path by a predetermined amount.

When a difference between the temperature of the exhaust gas measured by the first temperature sensor and the temperature of the exhaust gas measured the second temperature sensor is equal to or greater than a preset temperature, the temperature of the exhaust gas measured by the first temperature sensor is greater than the temperature of the exhaust gas measured by the second temperature sensor, and an operating region of a vehicle is not a main operating region, the controller may be configured to increase an amount of a fuel to be supplied to a combustion chamber that communicates with the second internal fluid path by a predetermined amount.

Further, when a difference between the temperature of the exhaust gas measured by the first temperature sensor and the temperature of the exhaust gas measured the second temperature sensor is equal to or greater than a preset temperature, the temperature of the exhaust gas measured by the first temperature sensor is equal to or greater than the temperature of the exhaust gas measured by the second temperature sensor, and an operating region of a vehicle is a main operating region, the controller may be configured to reduce an amount of a fuel to be supplied to a combustion chamber that communicates with the first internal fluid path by a predetermined amount.

When the engine speed is equal to or greater than a preset speed and an opening amount of a throttle valve is equal to or greater than a preset value, the controller may be configured to determine that the operating region of a vehicle is the main operating region. When a difference between the temperature of the exhaust gas measured by the first temperature sensor and the temperature of the exhaust gas measured the second temperature sensor is less than or equal to a preset temperature, the controller may be configured to adjust an amount of exhaust gas recirculated to the combustion chamber and an opening amount of the vane of the turbocharger based on an average temperature determined by averaging the temperature of the exhaust gas detected by the first temperature sensor and the temperature of the exhaust gas detected by the second temperature sensor for a predetermined time.

Another exemplary embodiment of the present invention provides an engine control method that may include: measuring, by a first temperature sensor, a temperature of exhaust gas flowing through a first internal fluid path of an exhaust manifold and measuring, by a second temperature sensor, a temperature of exhaust gas flowing through a second internal fluid path of an exhaust manifold, measuring exhaust gas exhausted from a combustion chamber of an engine flowing through an internal fluid path divided into the first internal fluid path and the second internal fluid path by a partition; determining whether a difference between the temperature of exhaust gas detected by the first temperature sensor and the temperature of exhaust gas detected by the second temperature sensor is less than or equal to a preset temperature; and adjusting an amount of exhaust gas recirculated to the combustion chamber, an opening amount of a vane of a turbocharger, and an amount of a fuel to be injected to the plurality of combustion chambers using the temperature of the exhaust gas detected by the first temperature sensor and the temperature of the exhaust gas detected by the second temperature sensor.

When a difference between the temperature of the exhaust gas detected by the first temperature sensor and the temperature of the exhaust gas detected by the second temperature sensor is less than the preset temperature, the adjustment of the amount of exhaust gas may include: determining an average temperature by averaging the temperature of the exhaust gas detected by the first temperature sensor and the temperature of the exhaust gas detected by the second temperature sensor for a predetermined time; and adjusting the amount of exhaust gas recirculated to the combustion chamber and the opening amount of a vane of a turbocharger based on the average temperature.

When a difference between the temperature of the exhaust gas detected by the first temperature sensor and the temperature of the exhaust gas detected by the second temperature sensor is greater than the preset temperature, the adjustment of the amount of exhaust gas may include: determining whether the temperature of the exhaust gas detected by the first temperature sensor is greater than the temperature of the exhaust gas detected by the second temperature sensor; and reducing an amount of a fuel to be supplied to a combustion chamber that communicates with the second internal fluid path by a predetermined amount when the temperature of the exhaust gas detected by the first temperature sensor is less than the temperature of the exhaust gas detected by the second temperature sensor.

The engine control method may further include: when the temperature of the exhaust gas detected by the first temperature sensor is equal to or greater than the temperature of the exhaust gas detected by the second temperature sensor, determining whether an operating region of a vehicle is a main operating region; and reducing an amount of a fuel to be supplied to a combustion chamber that communicates with the first internal fluid path by a predetermined amount when the operating region of a vehicle is the main operating region.

Additionally, the engine control method may further include increasing an amount of a fuel to be supplied to a combustion chamber that communicates with the second internal fluid path by a predetermined amount when the operating region of a vehicle is not the main operating region. The engine control method may further include determining that the operating region of a vehicle is the main operating region when engine speed is equal to or greater than a preset speed and an opening amount of a throttle valve is a preset value.

In accordance with the apparatus for operating an engine system according to an exemplary embodiment of the present invention as described above, two temperature sensors may be disposed within the exhaust manifold, and an amount of air excessively supplied and an amount of exhaust gas recirculated into a combustion chamber of an engine may be more accurately adjusted by adjusting an amount of a fuel supplied to the combustion chamber of the engine through a temperature difference measured by each temperature sensor.

BRIEF DESCRIPTION OF THE DRAWINGS

In the following detailed description, exemplary embodiments of the present invention have been shown and described, simply by way of illustration.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the present invention.

For the purpose of clear description of an exemplary embodiment of the present invention, parts which are not related to the description are omitted. The same reference numbers are used throughout the specification to refer to the same or like parts. Further, the size and thickness of each configuration shown in the drawings are optionally illustrated for better understanding and ease of description, the present invention is not limited to shown drawings, and the thickness is exaggerated for clarity of a plurality of parts and regions.

Hereinafter, an apparatus for controlling an engine system according to an exemplary embodiment of the present invention will be described in detail with reference to the accompanying drawings.

Figure 1:
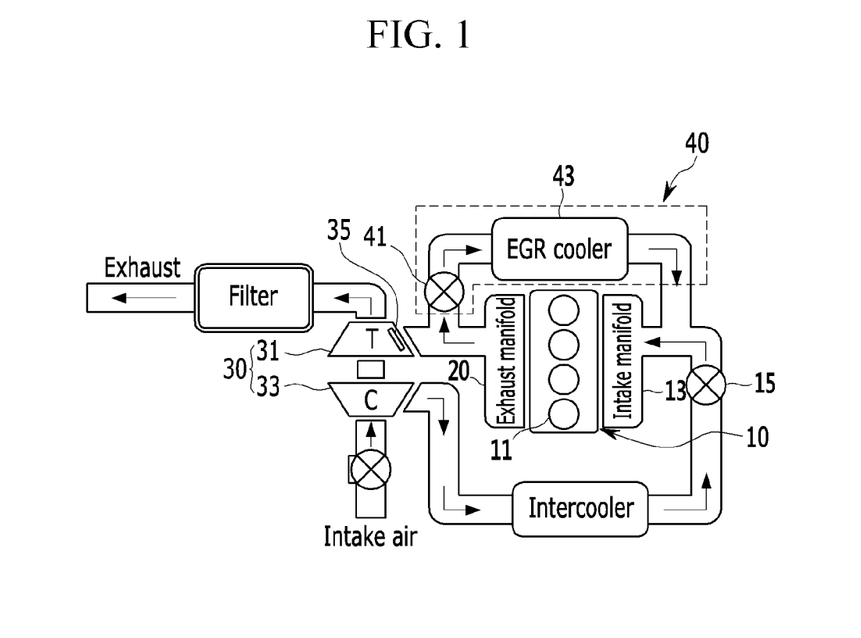
FIG. 1 is an exemplary schematic view illustrating a configuration of an engine control system according to an exemplary embodiment of the present invention.
Figure 2:
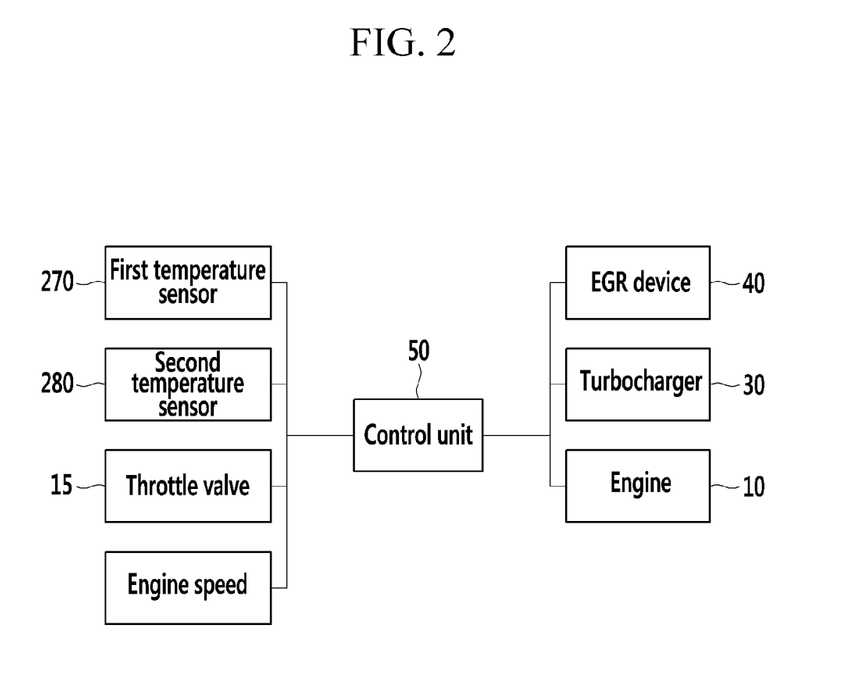
FIG. 2 is an exemplary block diagram illustrating a configuration of an engine control system according to an exemplary embodiment of the present invention.

FIG. 1 is an exemplary schematic view illustrating a configuration of an engine control system according to an exemplary embodiment of the present invention. FIG. 2 is an exemplary block diagram illustrating a configuration of an engine control system according to an exemplary embodiment of the present invention. As shown in FIG. 1 and in FIG. 2, the apparatus for controlling an engine system according to an exemplary embodiment of the present invention may include: an engine 10 configured to provide driving torque; a turbocharger 30 configured to provide supercharged air to the engine 10; an EGR device 40 configured to extract exhaust gas of a previous state of the turbocharger 30 to recirculate the extracted exhaust gas to the engine 10; and a controller 50 configured to operate the engine 10, the turbocharger 30, and the EGR device 40.

The engine 10 may include a plurality of combustion chambers 11, and may be configured to provide driving torque through combustion of the fuel injected into each combustion chamber 11. The engine 10 may include an exhaust manifold 20, and the plurality of combustion chambers 11 may communicate with, that is, be connected to the exhaust manifold 20. The engine 10 may include an injector (not shown), and the controller 50 may be configured to adjust an amount of fuel to be injected into the combustion chamber 11 through the injector.

Figure 3:
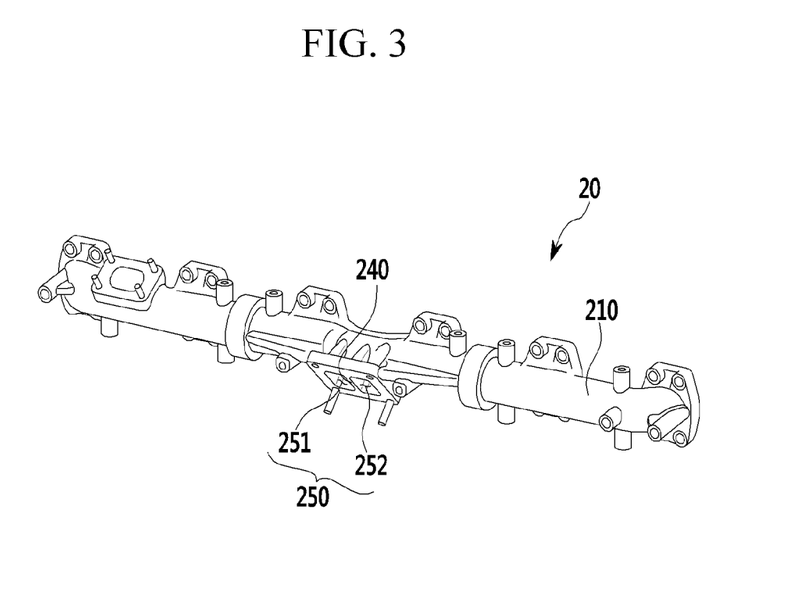
FIG. 3 is an exemplary perspective view illustrating a configuration of an exhaust manifold according to an exemplary embodiment of the present invention.
Figure 4:
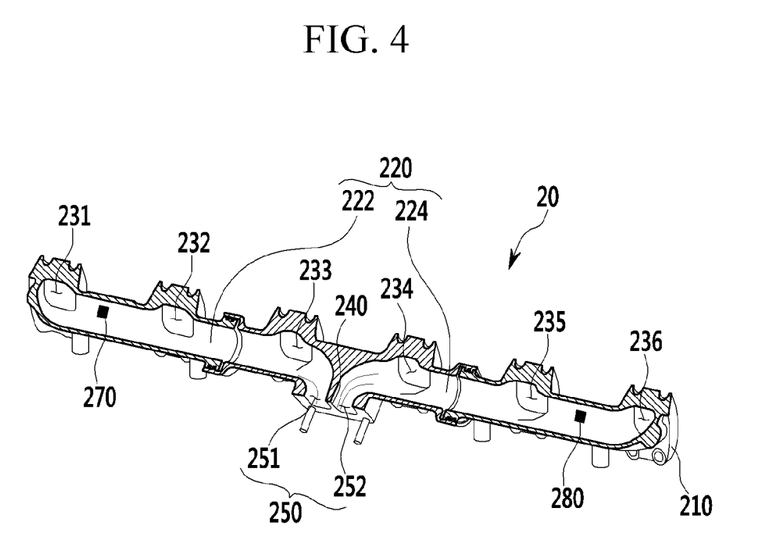
FIG. 4 is an exemplary cross-sectional view illustrating a configuration of an exhaust manifold according to an exemplary embodiment of the present invention.

FIG. 3 is an exemplary perspective view illustrating a configuration of an exhaust manifold according to an exemplary embodiment of the present invention. FIG. 4 is an exemplary cross-sectional view illustrating a configuration of the exhaust manifold according to an exemplary embodiment of the present invention.

As shown in FIG. 3 and FIG. 4, the exhaust manifold 20 may include a body 210 formed therein with an internal fluid path 220; a plurality of exhaust inlets 231, 232, 233, 234, 235, and 236 formed in the body 210 and in which exhaust gas exhausted from the plurality of combustion chambers 11 may be introduced; a partition 240 to divide the internal fluid path 220; and an exhaust outlet 250 to which the exhaust gas introduced from the plurality of exhaust inlets 231, 232, 233, 234, 235, and 236 may be exhausted.

In particular, the exhaust outlet 250 may be divided into a first exhaust outlet 251 and a second exhaust outlet 252 by the partition 240. The internal fluid path 220 may be divided into a first internal fluid path 222 and a second internal fluid path 224 by the partition 240 formed within the exhaust manifold 20. The exhaust gas flowing through the first internal fluid path 222 and the second internal fluid path 224 may be exhausted through the exhaust outlet.

Accordingly, when the internal fluid path 220 is divided into the first internal fluid path 222 and the second internal fluid path 224 by the partition 240, under the same exhaust fluid amount condition, pulsation due to the exhaust gas may be reduced thus increasing boost efficiency by the turbocharger 30. A first temperature sensor 270 configured to measure a temperature of the exhaust gas may be disposed within the first internal fluid path 222, and a second temperature sensor 280 configured to measure a temperature of the exhaust gas may be disposed within the second internal fluid path 224. Temperatures of the exhaust gases measured by the first temperature sensor 270 and the second temperature sensor 280 may be provided to the controller 50, respectively.

Referring back to FIG. 1 and FIG. 2, the turbocharger 30 may include a turbine 31 rotated by the exhaust gas exhausted (e.g., ejected, discharged, etc.) from the plurality of combustion chambers 11, a compressor 33 rotated in connection with the turbine 31 to compress the air introduced from the exterior, and a vane 35 configured to adjust an exhaust gas amount supplied to the turbine 31. When an opening amount of the vane 35 is reduced, a flow rate of the exhaust gas introduced into the turbine 31 may increase, and boost pressure applied to the combustion chamber 11 may increase. In contrast, when the opening amount of the vane 35 is increased, the flow rate of the exhaust gas introduced into the turbine 31 may decrease, and the boost pressure applied to the combustion chamber 11 may decrease.

The exhaust gas recirculation (EGR) device may include an EGR valve 41 configured to extract exhaust gas at a substantially high temperature (e.g., a predetermined temperature) formed at a previous state of the turbocharger 30 to recirculate the extracted exhaust gas to the engine 10, and adjust a fluid amount of the EGR, and an EGR cooler 43 configured to cool (e.g., decrease a temperature of) exhaust gas at a high temperature recirculated through the EGR valve 41 to introduce the cooled exhaust gas into the engine 10 through an intake manifold 13.

The compressed air passing through the turbocharger 30 may be cooled using an intercooler within an intake line and the cooled air may be supplied into the combustion chamber 11 of the engine 10 through a throttle valve 15. The controller 50 may be configured to adjust an opening amount of a vane 35 of the turbocharger 30, a recirculation amount of the exhausted gas, and an amount of a fuel to be supplied to the plurality of combustion chambers 11 based on the temperatures of the exhaust gas detected by the first temperature sensor 270 and the second temperature sensor 280.

The recirculation amount of the exhaust gas may be adjusted by the EGR valve 41, and the amount of the fuel to be supplied to the combustion chamber 11 may be adjusted using the injector. Particularly, the controller 50 may include at least one processor operated by a preset program, and the predetermined program performs respective steps of the method for operating the engine system according to an exemplary embodiment of the present invention.

When the difference between a temperature of the exhaust gas detected by the first temperature sensor 270 and a temperature of the exhaust gas detected by the second temperature sensor 280 is equal to or greater than a preset temperature, and the temperature of the exhaust gas detected by the second temperature sensor 280 is equal to or greater than the temperature of the exhaust gas detected by the first temperature sensor 270, the controller 50 may be configured to reduce an amount of a fuel to be supplied to the combustion chamber 11 that communicates with (e.g., is connected to) the second internal fluid path 224 by a predetermined amount.

In other words, when the difference in the temperature of the exhaust gas detected by the two temperature sensors is equal to or greater than the preset temperature, the controller 50 may be configured to determine a substantial deviation of the amount of the fuel to be supplied into the combustion chamber 11, and thus may be configured to reduce the amount of the fuel to be supplied to the combustion chamber 11 with exhaust gas of a substantially high temperature by a predetermined amount.

When the difference between a temperature of the exhaust gas detected by the first temperature sensor 270 and a temperature of the exhaust gas detected by the second temperature sensor 280 is equal to or greater than the preset temperature, the temperature of the exhaust gas detected by the second temperature sensor 280 is less than the temperature of the exhaust gas detected by the first temperature sensor 270, and an operating region of a vehicle is not a main operating region, the controller 50 may be configured to increase an amount of a fuel to be supplied to the combustion chamber 11 that communicates with the second internal fluid path 224 by a predetermined amount (i.e., about 1%).

In particular, the controller 50 may be configured to determine whether the operating region of a vehicle is the main operating region based on engine speed and an opening amount of a throttle valve. In other words, when the engine speed is equal or greater than the preset speed (i.e., about 800 RPM) and the opening amount of the throttle valve is equal to or greater than the preset value (i.e., about 50%), the controller 50 may be configured to determine that the operating region of a vehicle is the main operating region.

In response to determining that the operating region of a vehicle is not the main operating region based on the engine speed and an opening amount of a throttle valve, the controller 50 may be configured to increase the amount of the fuel to be supplied to the combustion chamber 11 that communicates with the second internal fluid path 224 with exhaust gas of a substantially low temperature (e.g., a predetermined temperature) by a predetermined amount. As described above, since the influence due to a heat load may be minimal when the operating region of a vehicle is not the main operating region, the controller 50 may be configured to increase the amount of the fuel to be supplied to the combustion chamber 11 that communicates with the second internal fluid path 224 with exhaust gas of a substantially low temperature.

When the temperature of the exhaust gas detected by the first temperature sensor 270 is equal to or greater than the temperature of the exhaust gas detected by the second temperature sensor 280, and the operating region of a vehicle may be determined to be the main operating region, that is, when the engine speed is equal to or greater than a preset speed, and the opening amount of the throttle valve is equal to or greater than the preset value, the controller 50 may be configured to reduce the amount of the fuel to be supplied to the combustion chamber 11 that communicates with the first internal fluid path 222 with exhaust gas of a substantially low temperature by a predetermined amount.

In other words, in response to determining that the operating region of a vehicle is the main operating region based on the engine speed and the opening amount of the throttle valve, the controller 50 may be configured to reduce the amount of the fuel to be supplied to the combustion chamber 11 that communicates with the first internal fluid path 224 with exhaust gas of a substantially high temperature by a predetermined amount. As described above, since the influence upon other components may be substantial due to the heat load of the exhaust gas when the operating region of a vehicle is the main operating region, the controller 50 may be configured to reduce the amount of the fuel to be supplied to the combustion chamber 11 that communicates with the first internal fluid path 222 with exhaust gas of a substantially high temperature.

Meanwhile, when the difference between a temperature of the exhaust gas detected by the first temperature sensor 270 and a temperature of the exhaust gas detected by the second temperature sensor 280 is less than or equal to the preset temperature, the controller 50 may be configured to determine an average temperature by averaging the temperature of the exhaust gas detected by the first temperature sensor 270 and the temperature of the exhaust gas detected by the second temperature sensor 280 for a predetermined time. Further, the controller 50 may be configured to adjust a recirculation amount of the exhaust gas recirculated to the combustion chamber 11 and an opening amount of the vane 35 of the turbocharger 30 based on the calculated average temperature. In particular, the recirculation amount of the exhaust gas and the opening amount of the vane 35 of the turbocharger 30 may be stored within the controller 50 as map data based on the average temperature.

Figure 5:
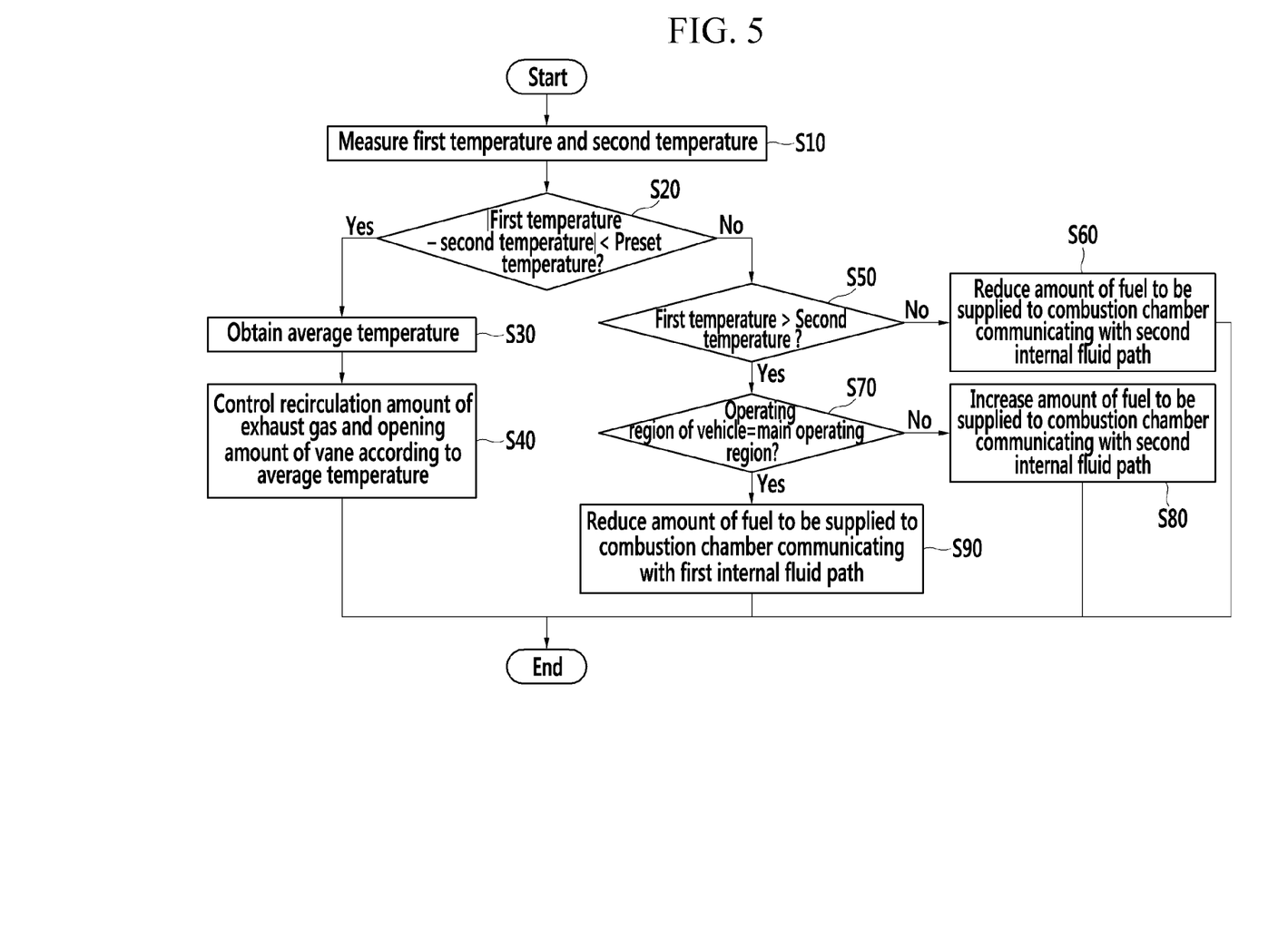
FIG. 5 is an exemplary flowchart illustrating an engine control method according to an exemplary embodiment of the present invention.

Hereinafter, the method for controlling the engine system according to an exemplary embodiment of the present invention will be described in detail with reference to the accompanying drawings. FIG. 5 is an exemplary flowchart illustrating an engine control method according to an exemplary embodiment of the present invention. As shown in FIG. 5, the controller 50 may be configured to measure a temperature Tfirst (hereinafter referred to as 'first temperature') of the exhaust gas flowing through the first internal fluid path 222 using a first temperature sensor 270 and a temperature Tsecond (hereinafter referred to as 'second temperature') of the exhaust gas flowing through the second internal fluid path 224 using a second temperature sensor 280 (S10).

The controller 50 may then be configured to determine whether a difference between the first temperature and the second temperature is less than or equal to a preset temperature (S20). When the difference between the first temperature and the second temperature is less than the preset temperature, the controller 50 may be configured to determine or calculate an average temperature by averaging the first temperature and the second temperature for a predetermined time (S30).

Further, the controller 50 may be configured to adjust a recirculation amount of the exhaust gas recirculated to the combustion chamber 11 and an opening amount of a vane 35 of the turbocharger 30 based on the calculated average temperature (S40). In particular, the recirculation amount of the exhaust gas may be adjusted using the EGR valve 41. The recirculation amount of the exhaust gas and the opening amount of a vane 35 of the turbocharger 30 may be stored within the controller 50 as map data based on the average temperature.

In the step S20, when the difference between the first temperature and the second temperature is greater than the preset temperature, the controller 50 may be configured to determine whether the temperature of the exhaust gas detected by the first temperature sensor 270 is greater than the temperature of the exhaust gas detected by the second temperature sensor 280 (S50). When the first temperature is less than the second temperature, the controller 50 may be configured to reduce an amount of a fuel to be supplied to the combustion chamber 11 that communicates with the second internal fluid path 224 by a predetermined amount (S60).

When the first temperature is equal to or greater than the second temperature, the controller 50 may be configured to determine whether an operating region of a vehicle is a main operating region (S70). In particular, when the engine speed is equal to or greater than a preset speed, and an opening amount of a throttle valve is equal to or greater than a preset value, the controller 50 may be configured to determine that the operating region of a vehicle is the main operating region. When the operating region of a vehicle is the main operating region, the controller 50 may be configured to reduce an amount of a fuel to be supplied to the combustion chamber 11 that communicates with the first internal fluid path 222 by a predetermined amount (S90). In addition, when the operating region of a vehicle is not the main operating region, the controller 50 may be configured to increase an amount of a fuel to be supplied to the combustion chamber 11 that communicates with the second internal fluid path 224 by a predetermined amount (S80).

DESCRIPTION OF SYMBOLS

10: engine
11: combustion chamber
15: throttle valve
20: exhaust manifold
30: turbocharger
31: turbine
33: compressor
35: vane
40: EGR device
41: EGR valve
43: EGR cooler
50: controller While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. An engine control method comprising:
   measuring, by a first temperature sensor, a temperature of exhaust gas flowing through a first internal fluid path of an exhaust manifold;
   measuring, by a second temperature sensor, a temperature of exhaust gas flowing through a second internal fluid path of the exhaust manifold;
   measuring, by a controller, an amount of exhaust gas exhausted from a plurality of combustion chambers of an engine flowing through an internal fluid path divided into the first internal fluid path and the second internal fluid path by a partition;
   determining, by the controller, whether a difference between the temperature of exhaust gas detected by the first temperature sensor and the temperature of exhaust gas detected by the second temperature sensor is less than or equal to a preset temperature; and
   adjusting, by the controller, an amount of exhaust gas recirculated to the combustion chambers, an opening amount of a vane of a turbocharger, and an amount of a fuel to be injected to the plurality of combustion chambers using the temperature of the exhaust gas detected by the first temperature sensor and the temperature of the exhaust gas detected by the second temperature sensor.

2. The engine control method of claim 1, wherein when a difference between the temperature of the exhaust gas detected by the first temperature sensor and the temperature of the exhaust gas detected by the second temperature sensor is less than the preset temperature, the adjustment of the amount of exhaust gas includes:
   determining, by the controller, an average temperature by averaging the temperature of the exhaust gas detected by the first temperature sensor and the temperature of the exhaust gas detected by the second temperature sensor for a predetermined time; and
   adjusting, by the controller, the amount of exhaust gas recirculated to the combustion chambers and the opening amount of the vane of the turbocharger based on the average temperature.

3. The engine control method of claim 1, wherein when a difference between the temperature of the exhaust gas detected by the first temperature sensor and the temperature of the exhaust gas detected by the second temperature sensor is greater than the preset temperature, the adjustment of the amount of exhaust gas includes:
- determining, by the controller, whether the temperature of the exhaust gas detected by the first temperature sensor is greater than the temperature of the exhaust gas detected by the second temperature sensor; and
- reducing, by the controller, an amount of a fuel to be supplied to one of the combustion chambers that is connected to the second internal fluid path when the temperature of the exhaust gas detected by the first temperature sensor is less than the temperature of the exhaust gas detected by the second temperature sensor.

4. The engine control method of claim 3, further comprising when the temperature of the exhaust gas detected by the first temperature sensor is equal to or greater than the temperature of the exhaust gas detected by the second temperature sensor;
- determining, by the controller, whether an operating region of a vehicle is a main operating region; and
- reducing, by the controller, an amount of a fuel to be supplied to one of the combustion chambers that is connected to the first internal fluid path when the operating region of a vehicle is the main operating region.

5. The engine control method of claim 4, further comprising:
- increasing, by the controller, an amount of a fuel to be supplied to one of the combustion chambers that is connected with the second internal fluid path when the operating region of a vehicle is not the main operating region.

6. The engine control method of claim 4, further comprising:
- determining, by the controller, that the operating region of a vehicle is the main operating region when engine speed is equal to or greater than a preset speed and an opening amount of a throttle valve is a preset value.

7. A non-transitory computer readable medium containing program instructions executed by a controller, the computer readable medium comprising:
- program instructions that control a first temperature sensor to measure a temperature of exhaust gas flowing through a first internal fluid path of an exhaust manifold;
- program instructions that control a second temperature sensor to measure a temperature of exhaust gas flowing through a second internal fluid path of the exhaust manifold;
- program instructions that measure an amount of exhaust gas exhausted from a plurality of combustion chambers of an engine flowing through an internal fluid path divided into the first internal fluid path and the second internal fluid path by a partition;
- program instructions that determine whether a difference between the temperature of exhaust gas detected by the first temperature sensor and the temperature of exhaust gas detected by the second temperature sensor is less than or equal to a preset temperature; and
- program instructions that adjust an amount of exhaust gas recirculated to the combustion chambers, an opening amount of a vane of a turbocharger, and an amount of a fuel to be injected to the plurality of combustion chambers using the temperature of the exhaust gas detected by the first temperature sensor and the temperature of the exhaust gas detected by the second temperature sensor.

8. The non-transitory computer readable medium of claim 7, wherein when a difference between the temperature of the exhaust gas detected by the first temperature sensor and the temperature of the exhaust gas detected by the second temperature sensor is less than the preset temperature, the adjustment of the amount of exhaust gas includes:
- program instructions that determine an average temperature by averaging the temperature of the exhaust gas detected by the first temperature sensor and the temperature of the exhaust gas detected by the second temperature sensor for a predetermined time; and
- program instructions that adjust the amount of exhaust gas recirculated to the combustion chambers and the opening amount of the vane of the turbocharger based on the average temperature.

9. The non-transitory computer readable medium of claim 7, wherein when a difference between the temperature of the exhaust gas detected by the first temperature sensor and the temperature of the exhaust gas detected by the second temperature sensor is greater than the preset temperature, the adjustment of the amount of exhaust gas includes:
- program instructions that determine whether the temperature of the exhaust gas detected by the first temperature sensor is greater than the temperature of the exhaust gas detected by the second temperature sensor; and
- program instructions that reduce an amount of a fuel to be supplied to one of the combustion chambers that is connected to the second internal fluid path when the temperature of the exhaust gas detected by the first temperature sensor is less than the temperature of the exhaust gas detected by the second temperature sensor.

10. The non-transitory computer readable medium of claim 9, further comprising when the temperature of the exhaust gas detected by the first temperature sensor is equal to or greater than the temperature of the exhaust gas detected by the second temperature sensor;
- program instructions that determine whether an operating region of a vehicle is a main operating region; and
- program instructions that reduce an amount of a fuel to be supplied to one of the combustion chambers that is connected to the first internal fluid path when the operating region of a vehicle is the main operating region.

11. The non-transitory computer readable medium of claim 10, further comprising:
- program instructions that increase an amount of a fuel to be supplied to one of the combustion chambers that is connected with the second internal fluid path when the operating region of a vehicle is not the main operating region.

12. The non-transitory computer readable medium of claim 9, further comprising:
- program instructions that determine that the operating region of a vehicle is the main operating region when engine speed is equal to or greater than a preset speed and an opening amount of a throttle valve is a preset value.

13. An engine control system, comprising:
- an engine including a plurality of combustion chambers and configured to provide driving torque through combustion of a fuel to be injected into the combustion chambers;
- a turbocharger including a turbine rotated based on flow energy of exhaust gas exhausted from the engine, a compressor configured to compress external air in synchronization with the rotation of the turbine to supply the compressed air to a cylinder, and a vane configured to adjust an amount of exhaust gas to be supplied to the turbine;

an exhaust gas recirculation (EGR) device configured to recirculate a portion of exhaust gas exhausted from the combustion chambers to supply the recirculated gas to the combustion chambers;

an exhaust manifold including a body formed therein with an internal fluid path, a plurality of exhaust inlets formed within the body and in which exhaust gas exhausted from the plurality of combustion chambers is introduced, a partition to divide the internal fluid path into a first internal fluid path and a second internal fluid path, and an exhaust outlet to which exhaust gas introduced from the plurality of exhaust inlets is exhausted;

a first temperature sensor configured to measure a temperature of exhaust gas flowing through the first internal fluid path;

a second temperature sensor configured to measure a temperature of exhaust gas flowing through the second internal fluid path; and a controller configured to adjust an opening amount of the vane of the turbocharger, an amount of exhaust gas recirculated using the EGR device, and an amount of a fuel to be injected to the plurality of combustion chambers based on the temperature of the exhaust gas measured by the first temperature sensor and the temperature of the exhaust gas measured by the second temperature sensor, wherein when a difference between the temperature of the exhaust gas measured by the first temperature sensor and the temperature of the exhaust gas measured by the second temperature sensor is equal to or greater than a preset temperature, and the temperature of the exhaust gas measured by the second temperature sensor is equal to or greater than the temperature of the exhaust gas measured by the first temperature sensor, the controller is configured to reduce an amount of a fuel to be supplied to one of the combustion chambers that is connected to the second internal fluid path.

14. The engine control system of claim 13, wherein when the difference between the temperature of the exhaust gas measured by the first temperature sensor and the temperature of the exhaust gas measured the second temperature sensor is equal to or greater than the preset temperature, the temperature of the exhaust gas measured by the first temperature sensor is equal to or greater than the temperature of the exhaust gas measured by the second temperature sensor, and an operating region of a vehicle is a main operating region, the controller is configured to reduce the amount of the fuel to be supplied to one of the combustion chambers that is connected to the first internal fluid path.

15. The engine control system of claim 13, wherein when a difference between the temperature of the exhaust gas measured by the first temperature sensor and the temperature of the exhaust gas measured the second temperature sensor is less than or equal to the preset temperature, the controller is configured to adjust an amount of exhaust gas recirculated to the combustion chambers and an opening amount of the vane of the turbocharger based on an average temperature determined by averaging the temperature of the exhaust gas detected by the first temperature sensor and the temperature of the exhaust gas detected by the second temperature sensor for a predetermined time.

16. The engine control system of claim 13, wherein when the difference between the temperature of the exhaust gas measured by the first temperature sensor and the temperature of the exhaust gas measured the second temperature sensor is equal to or greater than the preset temperature, the temperature of the exhaust gas measured by the first temperature sensor is greater than the temperature of the exhaust gas measured by the second temperature sensor, and an operating region of a vehicle is not a main operating region, the controller is configured to increase the amount of the fuel to be supplied to one of the combustion chambers that is connected to the second internal fluid path.

17. The engine control system of claim 16, wherein when engine speed is equal to or greater than a preset speed and an opening amount of a throttle valve is equal to or greater than a preset value, the controller is configured to determine that the operating region of a vehicle is the main operating region.

* * * * *